United States Patent
Iguchi et al.

(10) Patent No.: US 11,823,842 B2
(45) Date of Patent: *Nov. 21, 2023

(54) CERAMIC ELECTRONIC DEVICE

(71) Applicant: TDK CORPORATION, Tokyo (JP)

(72) Inventors: Toshihiro Iguchi, Tokyo (JP); Yuichiro Sueda, Tokyo (JP); Ryota Namiki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 36 days.

This patent is subject to a terminal disclaimer.

(21) Appl. No.: 17/683,897

(22) Filed: Mar. 1, 2022

(65) Prior Publication Data

US 2022/0285098 A1    Sep. 8, 2022

(30) Foreign Application Priority Data

Mar. 8, 2021    (JP) .................. 2021-036612

(51) Int. Cl.
*H01G 4/232* (2006.01)
*H01G 4/12* (2006.01)
*H01G 4/30* (2006.01)

(52) U.S. Cl.
CPC ......... *H01G 4/2325* (2013.01); *H01G 4/1227* (2013.01); *H01G 4/30* (2013.01)

(58) Field of Classification Search
CPC .... H01G 4/2325; H01G 4/1209; H01G 4/248; H01G 4/30; H01G 4/012; H01G 4/1227; H01G 4/0085; H01G 4/1236
See application file for complete search history.

(56) References Cited

U.S. PATENT DOCUMENTS

| | | | |
|---|---|---|---|
| 5,536,293 A * | 7/1996 | Yamamoto | C03C 8/18 252/519.54 |
| 10,008,326 B2 * | 6/2018 | Koga | H01G 4/1227 |
| 10,861,649 B2 * | 12/2020 | Nakamura | C04B 35/16 |
| 2009/0290281 A1 * | 11/2009 | Nagamoto | H01G 4/2325 29/25.42 |
| 2012/0057272 A1 * | 3/2012 | Hirata | H01G 4/1236 361/321.4 |
| 2016/0104578 A1 * | 4/2016 | Kang | H01G 4/2325 361/301.4 |
| 2020/0115275 A1 * | 4/2020 | Awagakubo | H01B 1/22 |
| 2020/0126723 A1 * | 4/2020 | Ooe | H01G 4/30 |
| 2021/0323859 A1 * | 10/2021 | Tateno | C03C 8/18 |
| 2022/0285097 A1 * | 9/2022 | Iguchi | H01G 4/2325 |
| 2022/0293344 A1 * | 9/2022 | Iguchi | H01G 4/1227 |

FOREIGN PATENT DOCUMENTS

JP    H04-171912 A    6/1992

* cited by examiner

*Primary Examiner* — Dion R. Ferguson
(74) *Attorney, Agent, or Firm* — Oliff PLC

(57) ABSTRACT

A ceramic electronic device includes an element body and an external electrode. The element body includes a ceramic layer and an internal electrode layer. The external electrode is formed on an end surface of the element body and electrically connected to a part of the internal electrode layer. The ceramic layer includes a perovskite compound represented by $ABO_3$ as a main component. The external electrode includes a conductor and a glass frit diffused in the conductor. The glass frit includes B, Si, Ba, and Zn. A boundary layer is present at an end of the ceramic layer in contact with the external electrode on the end surface of the element body and comprises an oxide including Ba, Zn, and Si.

11 Claims, 2 Drawing Sheets

Figure 1:
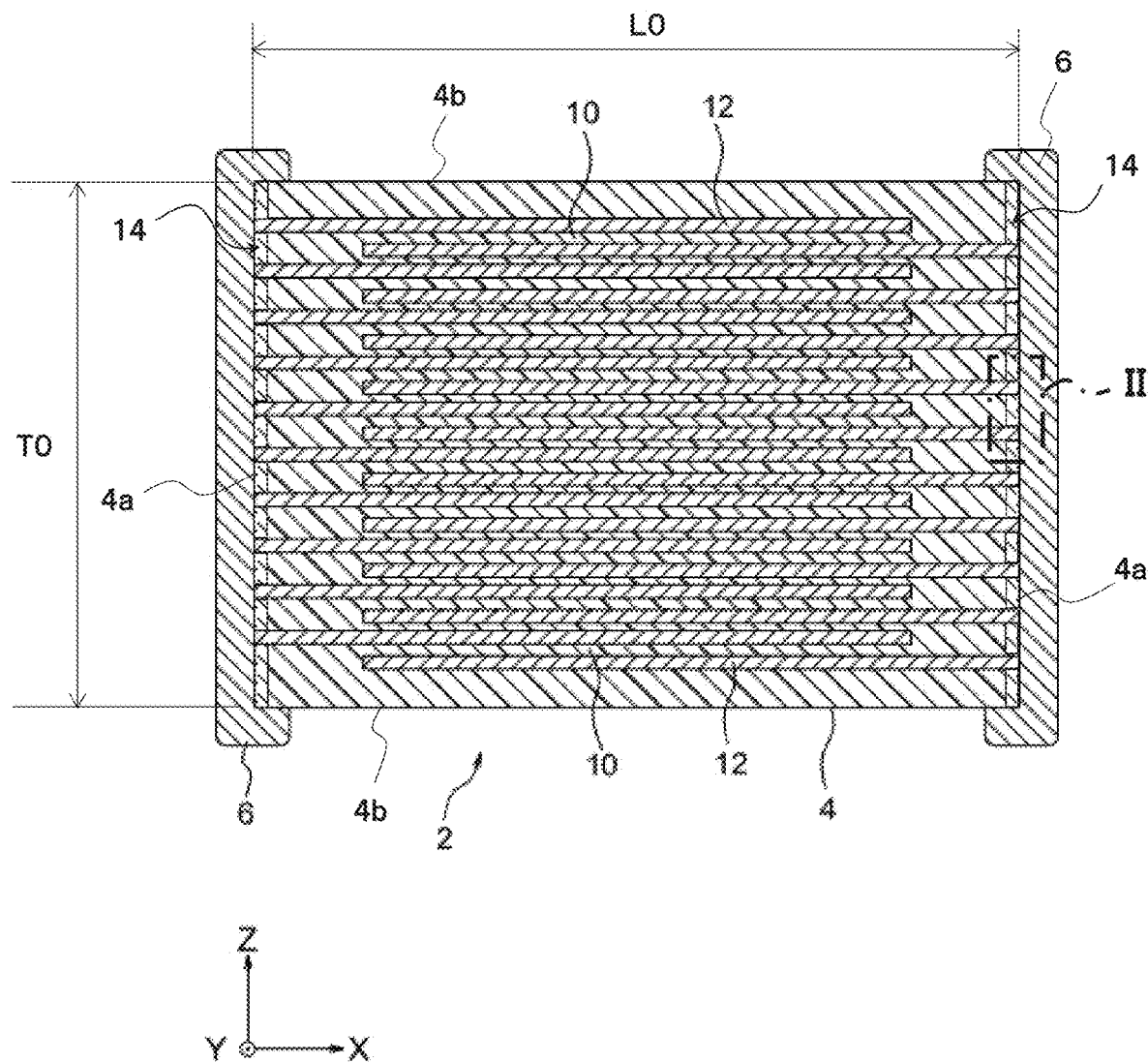

CERAMIC ELECTRONIC DEVICE

BACKGROUND OF THE INVENTION

The present invention relates to a ceramic electronic device including an external electrode.

As shown in Patent Document 1, a ceramic electronic device including an element body containing a ceramic component and external electrodes formed on an outer surface of the element body is known. Baked electrodes are widely used as external electrodes for ceramic electronic devices, and the baked electrodes can be formed by applying a conductive paste containing conductor powder and glass frit to the surface of the element body and baking it. The baked electrodes can have a higher joint strength as compared with when a plating electrode or a resin electrode is directly formed on the surface of the element body.

When a load, such as thermal shock, is applied to the ceramic electronic device, however, stress is generated in the interface between the baked electrode and the surface of the element body, and the baked electrode may peel off from the surface of the element body. Therefore, it is required to develop a technique for improving the joint reliability between the element body and the baked electrode.

Patent Document 1: JPH04171912 (A)

BRIEF SUMMARY OF THE INVENTION

The present invention has been achieved under such circumstances. It is an object of the present invention to provide a ceramic electronic device having a high joint reliability between an element body and an external electrode.

To achieve the above object, a ceramic electronic device according to the present invention comprises:

an element body including a ceramic layer and an internal electrode layer; and an external electrode formed on an end surface of the element body and electrically connected to a part of the internal electrode layer, wherein the ceramic layer comprises a perovskite compound represented by $ABO_3$ as a main component, the external electrode comprises a conductor and a glass frit diffused in the conductor, the glass frit comprises B, Si, Ba, and Zn, and a boundary layer is present at an end of the ceramic layer in contact with the external electrode on the end surface of the element body and comprises an oxide including Ba, Zn, and Si.

The present inventors have found that the ceramic electronic device having the above-mentioned configurations improves the joint reliability between the element body and the external electrode more than before. That is, the ceramic electronic device according to the present invention can prevent the external electrode from peeling from the end surface of the element body even if receiving a thermal shock. The reason why the above-mentioned effect is obtained is not necessarily clear, but the following reasons can be considered.

First, it is considered that the mutual diffusion phenomenon contributes to the improvement in joint reliability. In the present invention, Ba, Zn, and Si are common elements between the external electrode and the boundary layer. Thus, the above-mentioned common elements are considered to mutually be diffused between the external electrode and the boundary layer, and this mutual diffusion is considered to improve the joint strength of the external electrode to the element body. The boundary layer containing the predetermined elements as mentioned above is considered to exhibit a function of reducing the thermal stress generated between the element body and the external electrode, and the stress reduction effect is considered to improve the resistance for thermal shock and the like.

Preferably, the boundary layer further comprises the perovskite compound. When the boundary layer includes the main component constituting the ceramic layer of the element body, the joint strength between the boundary layer and the element body is further improved.

Preferably, the oxide contained in the boundary layer comprises: a Zn content of 0.27 parts by mol to 0.40 parts by mol; a Si content of 0.27 parts by mol to 0.40 parts by mol; and a remainder of Ba, provided that a total of the Ba content, the Zn content, and the Si content is 1 part by mol. Instead, preferably, the oxide contained in the boundary layer is $BaZnSiO_4$. When the boundary layer satisfies the above-mentioned requirements, the joint reliability between the element body and the external electrode tends to further be improved.

Preferably, the glass frit contained in the external electrode comprises: a Si content of 0.05 parts by mol to 0.20 parts by mol; a Ba content of 0.05 parts by mol to 0.25 parts by mol; a Zn content of 0.15 parts by mol to 0.35 parts by mol; and a remainder of B, provided that a total of the B content, the Si content, the Ba content, and the Zn content is 1 part by mol. When the external electrode satisfies the above-mentioned requirements, the joint reliability between the element body and the external electrode tends to further be improved.

Preferably, the conductor contained in the external electrode comprises Cu.

Preferably, three or more diffusion regions, where the glass frit is directly in contact with the boundary layer, are present in 100 µm of a joint boundary between the end surface of the element body and the external electrode in a cross section including the joint boundary. When the requirements are satisfied, the joint reliability between the element body and the external electrode tends to further be improved.

BRIEF DESCRIPTION OF THE DRAWING(S)

Figure 2:
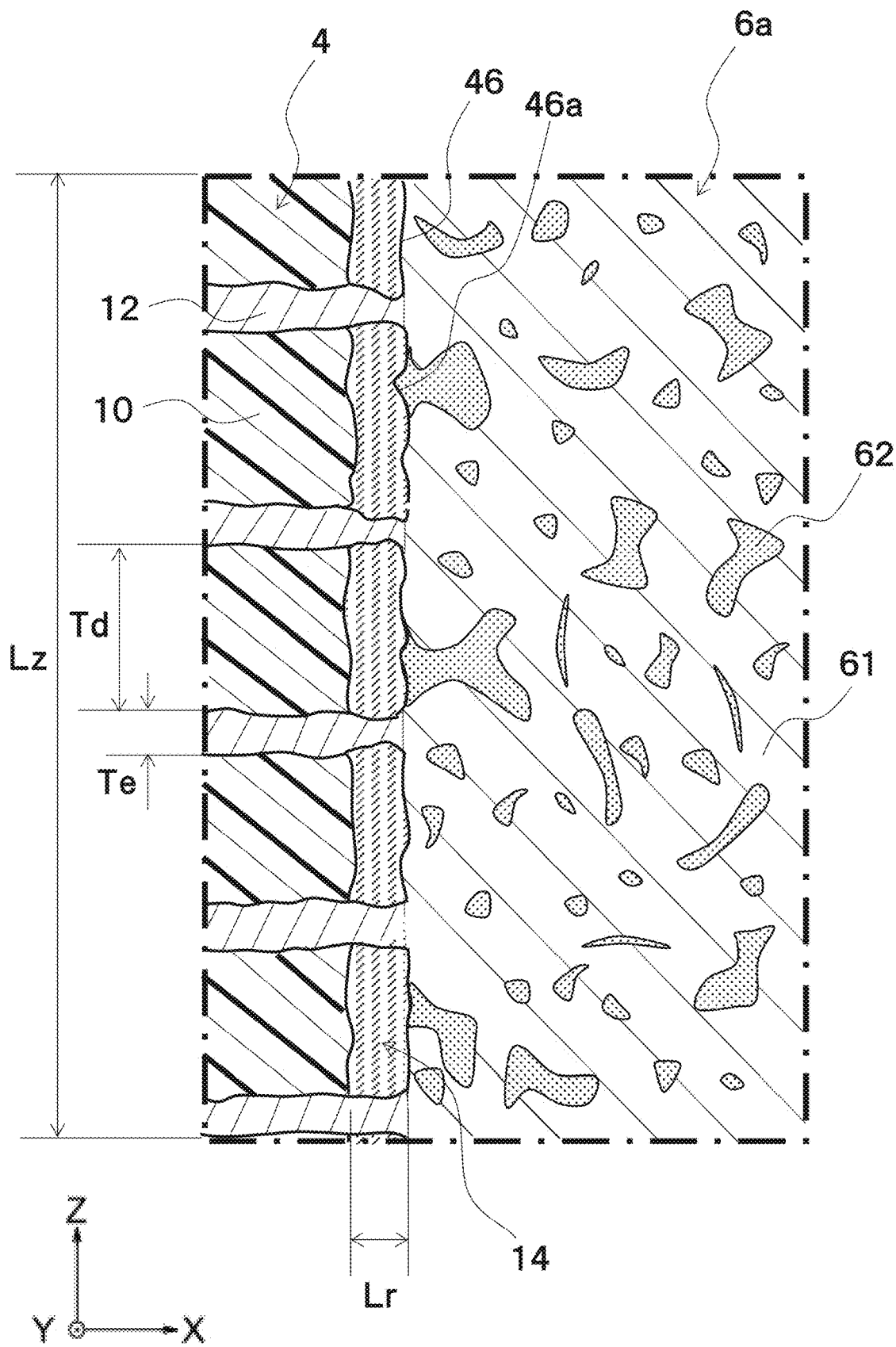

FIG. 1 is a cross-sectional view illustrating a multilayer ceramic capacitor according to an embodiment of the present invention; and FIG. 2 is an enlarged cross-sectional view of a main part of the region II shown in FIG. 1.

DETAILED DESCRIPTION OF THE INVENTION

Hereinafter, the present invention is explained in detail based on an embodiment shown in the figures.

In the present embodiment, a multilayer ceramic capacitor 2 shown in FIG. 1 is described as a ceramic electronic device according to the present invention. The multilayer ceramic capacitor 2 includes an element body 4 and a pair of external electrodes 6 formed on the external surface of the element body 4.

The element body 4 shown in FIG. 1 normally has a substantially rectangular parallelepiped shape and includes two end surfaces 4a facing each other in the X-axis direction, two side surfaces 4b facing each other in the Y-axis direction, and two side surfaces 4b facing each other in the Z-axis direction, but the element body 4 may have any other shape, such as elliptical columnar shape, columnar shape, and prismatic shape. The element body 4 has any outer size and can have, for example, a length L0 of 0.4-5.7 mm in the X-axis direction, a width W0 of 0.2-5.0 mm in the Y-axis direction, and a height T0 of 0.2-3.0 mm in the Z-axis direction. In the present embodiment, the X-axis, the Y-axis, and the Z-axis are perpendicular to each other.

The element body 4 includes ceramic layers 10 and internal electrode layers 12 substantially parallel to the plane including the X-axis and the Y-axis. In the inside of the element body 4, the ceramic layers 10 and the internal electrode layers 12 are laminated alternately along the Z-axis direction. Here, "substantially parallel" means that most parts are parallel, but there may be a part that is not slightly parallel, and the ceramic layers 10 and the internal electrode layers 12 may slightly be uneven or inclined.

The ceramic layers 10 include a perovskite compound represented by $ABO_3$ as a main component. Here, the main component of the ceramic layers 10 is a component contained by 80 mol % or more to the entire ceramic layers 10.

In a perovskite compound, preferably, at least Ba is contained in the A-site. Among perovskite compounds, barium titanate (BT) or barium titanate calcium (BCT) is particularly preferable. Barium titanate and barium titanate calcium can normally be represented by a composition formula of $(Ba_{(1-a-b)}Sr_aCa_b)_m(Ti_{(1-c-d)}Zr_cHf_d)O_3$.

In the composition formula, each of a, b, c, d, and m is an elemental ratio, and each elemental ratio is not limited and can be determined within a known range. For example, "m" indicates an elemental ratio of the A-site to the B-site and can normally be 0.9-1.1. "a" indicates an elemental ratio of Sr to the A-site, and "b" indicates an elemental ratio of Ca to the A-site. In the present embodiment, $0 \leq a+b<1$ can be satisfied, and $0 \leq a+b \leq 0.1$ is preferably satisfied. "c" indicates an elemental ratio of Zr to the B-site, and "d" indicates an elemental ratio of Hf to the B-site. In the present embodiment, $0 \leq c+d<1.0$ can be satisfied, and $0 \leq c+d \leq 0.15$ is preferably satisfied. The elemental ratio of oxygen (O) in the above-mentioned composition formula may slightly deviate from the stoichiometric composition.

In addition to the above-mentioned main component, the ceramic layers 10 may include sub-components, such as Mn compounds, Mg compounds, Cr compounds, Ni compounds, rare earth element compounds, Si compounds, Li compounds, B compounds, and V compounds. There is no limit to the type, combination, or addition amount of the sub-components.

The average thickness Td (interlayer thickness) per layer of the ceramic layers 10 is not limited and can be, for example, 100 μm or less (preferably, 30 μm or less). The lamination number of ceramic layers 10 is determined based on desired characteristics and is not limited. For example, the lamination number of ceramic layers 10 is preferably 20 or more and is more preferably 50 or more.

Meanwhile, the internal electrode layers 12 are laminated between the ceramic layers 10. The lamination number of internal electrode layers 12 is determined based on the lamination number of ceramic layers 10. The average thickness Te of the internal electrode layers 12 per layer is not limited and can be, for example, 3.0 μm or less.

The internal electrode layers 12 are laminated so that their ends on one side are alternately exposed to the two end surfaces 4a of the element body 4 facing each other in the X-axis direction. Then, each of the pair of external electrodes 6 is formed on one end surface 4a of the element body 4 and is electrically connected to the exposed ends of the internal electrode layers 12 alternately arranged. Since the external electrodes 6 are formed in such a manner, a capacitor circuit with the external electrodes 6 and the internal electrode layers 12 is formed.

That is, the internal electrode layers 12 function as a part of the capacitor circuit to apply voltage to each of the ceramic layers 10. Thus, the internal electrode layers 12 are made of a conductive material, such as Cu, Ni, Ag, Pd, Au, Pt, and an alloy containing at least one of these metal elements. Preferably, the conductive material contained in the internal electrode layers 12 is Ni or a Ni based alloy because the constituent material of the ceramic layers 10 has reduction resistance. When Ni or a Ni based alloy is the main component, one or more sub-components for internal electrodes selected from Mn, Cu, Cr, etc. may be contained.

In addition to the above-mentioned conductive material, the internal electrode layers 12 may contain a ceramic component contained in the ceramic layers 10 as an inhibitor and may contain a trace amount of non-metal components, such as S and P (e.g., about 0.1 mass % or less).

As shown in FIG. 1, each of the external electrodes 6 according to the present embodiment integrally includes an end surface part formed on the end surface 4a of the element body 4 and extension parts formed at an end in the X-axis direction on each of the side surfaces 4b of the element body 4. That is, each of the external electrodes 6 is formed so as to range from the end surface 4a to a part of the side surfaces 4b of the element body 4. The external electrodes 6 are insulated so as not to contact with each other in the X-axis direction.

In the present embodiment, as mentioned above, the extension parts of the external electrodes 6 are formed on the four side surfaces 4b of the element body 4. However, the extension parts of the external electrodes 6 are not necessarily formed, and each of the external electrodes 6 may be formed from only the end surface part. Instead, when the multilayer ceramic capacitor 2 is surface-mounted on a substrate, the extension parts of the external electrodes 6 are formed at least on the side surface 4b facing a mounting surface of the substrate and are not necessarily formed on the side surface 4b opposite to the mounting surface.

FIG. 2 is an enlarged schematic cross-sectional view of a joint boundary 46 between the external electrode 6 and the element body 4. FIG. 2 illustrates one of the pair of external electrodes 6, but the other external electrode 6 has the same characteristics as the external electrode 6 shown in FIG. 2. Hereinafter, the detailed characteristics of the external electrodes 6 and the joint state between the external electrodes 6 and the element body 4 according to the present embodiment are explained based on FIG. 2.

As shown in FIG. 2, the external electrode 6 includes a baked electrode 6a including a conductor 61 and a glass frit 62, and the baked electrode 6a is in contact with the external surface (end surface 4a) of the element body 4. The external electrode 6 may be configured by a single electrode layer or may be configured by laminating a plurality of electrode layers. When the external electrode 6 is configured by a plurality of electrode layers, the baked electrode 6a is formed so as to be in contact with the external surface of the element body 4, and another baked electrode, a resin electrode, a plating electrode, or the like is formed on the baked electrode 6a. For example, the external electrode 6 can have a triple-layer structure of a baked electrode—a Ni plating layer—a Sn plating layer (laminated in this order). In this case, the Sn plating layer is located on the outermost surface of the external electrode 6, and the solder wettability of the external electrode 6 is thus favorable.

The average thickness of the baked electrode 6a in contact with the end surface 4a can be 5-200 μm and is preferably 50 μm or less. When the external electrode 6 is configured by a plurality of layers, the average thickness of the external electrode 6 can be about 5-300 μm and is preferably 100 μm or less.

The conductor 61 contained in the baked electrode 6a is a conductive metal, such as Cu, Ni, Ag, Pd, Au, Pt, and an alloy containing at least one of these metal elements, and is preferably Cu or a Cu alloy. When the conductor 61 is a Cu alloy, the conductor 61 may contain elements, such as Al, Ni, Ag, Pd, Sn, Zn, P, Fe, and Mn, in addition to Cu. The amount of elements other than Cu is preferably 5 parts by mol or less with respect to 100 parts by mol of Cu.

Meanwhile, the glass frit 62 is an amorphous glass containing B, Si, Ba, and Zn and is diffused in the conductor 61. Preferably, the composition of the glass frit 62 satisfies the following conditions. That is, the Si content is preferably 0.05 parts by mol to 0.20 parts by mol, the Ba content is preferably 0.05 parts by mol to 0.25 parts by mol, the Zn content is preferably 0.15 parts by mol to 0.35 parts by mol, and the remainder is B (preferably, the B content is 0.20 parts by mol to 0.60 parts by mol), provided that a total of the B content, the Si content, the Ba content, and the Zn content is 1 part by mol.

The compound structure of the glass frit 62 is not limited, and the above-mentioned composition ratio may be achieved by mixing a plurality of glass components. For example, the glass frit 62 may be a mixture of a glass component composed of $SiO_2$ and a glass component composed of $B_2O_3$—BaO—ZnO (preferably, $Ba_3Zn(BO_3)_2$). In addition to the above-mentioned main elements (B, Si, Ba, Zn, and O), the glass frit 62 may contain trace elements. Examples of the trace elements include Al, rare earth elements, Zr, Mn, Ca, Mg, Ti, K, Na, etc. Preferably, the total amount of trace elements is 0.2 parts by mol or less, provided that the total amount of main elements excluding O is 1.0 part by mol.

As mentioned above, the baked electrode 6a includes the conductor 61 and the glass frit 62 and may also include voids, oxide sub-components, and the like (not shown). The content ratio between the conductor 61 and the glass frit 62 in the baked electrode 6a is not limited. For example, the average area ratio of the conductor 61 to the cross section of the baked electrode 6a can be 30% to 90% and is preferably 70% to 90%.

The external electrode 6 can be analyzed by a cross-sectional observation using a scanning electron microscope (SEM), a scanning transmission electron microscope (STEM), or the like. For example, the compositions of the conductor 61 and the glass frit 62 can be measured by performing a component analysis with an electron probe microanalyzer (EPMA) in the cross-sectional observation. Preferably, the component analysis is performed at least at three points, and the composition of each element (61, 62) is calculated from an average of the measurement results. In the present embodiment, when a component analysis or the like is performed by EPMA, an energy dispersion type spectroscope (EDS) or a wavelength dispersion type spectroscope (WDS) can be used as the X-ray spectroscope.

An area ratio of the conductor 61 can be measured by performing an image analysis of a cross-sectional photograph obtained by a cross-sectional observation with SEM, STEM, or the like. When a cross section of the baked electrode 6a is observed with a backscattered electron image of SEM, a HAADF image of STEM, or the like, the conductor 61 with metal bonds can be recognized as a bright contrast part, and the non-metal components, such as the glass frit 62 (further including voids and oxides), can be recognized as a dark contrast part. Thus, an area ratio of the conductor 61 to a cross section of the baked electrode 6a can be calculated as a ratio of an area of the bright contrast part to an area of the entire measurement visual field by, for example, binarizing the cross-sectional photograph. Preferably, this measurement is performed at least at five visual fields to calculate this average.

As shown in FIG. 2, a boundary layer 14 is present between the external electrode 6 and the ceramic layers 10 of the element body 4. The boundary layer 14 is present at the ends of the ceramic layers 10 in the X-axis direction and constitutes a part of the outermost surface of the end surface 4a of the element body 4. When the external electrode 6 is formed from the end surface 4a to a part of the side surface 4b, the boundary layer 14 is preferably also present on the outermost surface of the side surface 4b in addition to the end surface 4a.

In the cross section shown in FIG. 2, the internal electrode layers 12 penetrate the boundary layer 14 and are exposed to the end surface 4a, and the ends of the exposed internal electrode layers 12 are electrically connected to the baked electrode 6a (particularly, the conductor 61) of the external electrode 6. When an X-Z cross section is observed, however, the point where the boundary layer 14 covers the ends of a part of the internal electrode layers 12 (the ends in the X-axis direction) may exist on the end surface 4a. Each of the internal electrode layers 12 exists along the Y-axis direction. As long as the end of each of the internal electrode layers 12 even partly penetrates the boundary layer 14 and is directly in contact with the baked electrode 6a, each of the internal electrode layers 12 and the external electrode 6 can electrically be connected even if the ends are partly covered with the boundary layer 14. The external electrode 6 may partly enter the boundary layer 14. The joint boundary 46 between the external electrode 6 and the end surface 4a of the element body 4 (the boundary layer 14, the internal electrode layers 12, or the like) may be unclear.

The average length Lr (average thickness) of the boundary layer 14 in the X-axis direction is preferably 1 μm to 10 μm and is more preferably 3 μm to 8 μm.

The boundary layer 14 includes an oxide containing Ba, Zn, Si, and O as a main component. The main component of the boundary layers 14 is a component contained at 50 mol % or more with respect to the entire boundary layer 14. The oxide is preferably a crystalline oxide that is not vitrified. Specifically, the oxide preferably satisfies the following composition.

That is, the oxide contained in the boundary layer 14 includes a Zn content of 0.27 parts by mol to 0.40 parts by mol, a Si content of 0.27 parts by mol to 0.40 parts by mol, and a remainder of Ba (preferably, the Ba content is 0.28 parts by mol to 0.39 parts by mol), provided that a total of the Ba content, the Zn content, and the Si content (a total amount of main elements other than O) is 1 part by mol. In particular, among oxides satisfying the above-mentioned composition ratio, $BaZnSiO_4$ is preferably contained in the boundary layer 14.

In addition to the above-mentioned oxide, the perovskite compound, which is a main component of the ceramic layers 10, is preferably contained in the boundary layer 14. The perovskite compound can be contained by intentionally being added to a raw material paste for the boundary layer 14. The perovskite compound may intrude the boundary layer 14 by being diffused from the ceramic layers 10, and the amount of the perovskite compound in the boundary layer 14 is no limited. The inclusion of the main component of the ceramic layers 10 in the boundary layer 14 is considered to further improve the joint strength of the boundary layer 14 to the ceramic layers 10.

In addition to the oxide and the perovskite compound mentioned above, the boundary layer 14 may include a trace compound containing Al, Ti, Ca, B, etc. The boundary layer 14 may include a conductive metal component, such as Cu and Ni. There is no limit to the amount of the trace compounds or the metal component.

The boundary layer 14 with the above-mentioned characteristics has a function of improving the joint strength between the ceramic layers 10 of the element body 4 and the baked electrode 6a. In particular, when a part of the glass fit 62 contained in the baked electrode 6a is directly in contact with a part of the boundary layer 14, the joint strength of the baked electrode 6a to the end surface 4a is further improved. Both of the glass frit 62 and the boundary layer 14 contain Ba, Zn, and Si, and the mutual diffusion of these common elements between the glass frit 62 and the boundary layer 14 is considered to improve the joint strength of the baked electrode 6a. In the present embodiment, a portion where a part of the glass frit 62 is directly in contact with a part of the boundary layer 14 is referred to as a diffusion region 46a (see FIG. 2).

Preferably, a predetermined number or more of diffusion regions 46a are present in a predetermined length Lz of the joint boundary 46 in the Z-axis direction. Specifically, when the predetermined length Lz is 100 μm, three or more diffusion regions 46a are preferably present, and seven or more diffusion regions 46a are more preferably present, in a cross section (X-Z cross section) including the joint boundary 46 between the end surface 4a and the external electrode 6 as shown in FIG. 2. The upper limit of the number of diffusion regions 46a is not limited, but is preferably 15 or less from the viewpoint of ensuring an electrical bonding between the internal electrode layers 12 and the baked electrode 6a.

In the cross section as shown in FIG. 2, the joint boundary 46 may be meandering or partially unclear. When the number of diffusion regions 46a is counted, it is not necessary to accurately measure the meandering points, unclear points, or the like of the joint boundary 46 and calculate a predetermined length Lz, and the width of the cross-sectional photograph may be regarded as a predetermined length Lz of the joint boundary 46. For example, as shown in FIG. 2, the cross-sectional photograph is taken so that the joint boundary 46 and one side of the cross-sectional photograph are substantially parallel to each other, and the width of the cross-sectional photograph in the Z-axis direction is regarded as a predetermined length Lz of the joint boundary 46.

Preferably, particles of the glass frit 62 directly in contact with the boundary layer 14 (i.e., particles of the glass frit 62 constituting the diffusion regions 46a) have a shape that exhibits an anchor effect. The "shape that exhibits an anchor effect" means that the particles do not spread thinly along the outer surface (Y-Z plane) of the boundary layer 14, but spread three-dimensionally from the outer surface of the boundary layer 14 toward the inside of the baked electrode 6a (i.e., outward in the X-axis direction) as shown in FIG. 2. That is, when the particles of the glass frit 62 located in the joint boundary 46 enter from the joint boundary 46 toward the gap of the conductor 61, an anchor effect is obtained as if the barb of the hook bites in, and the joint strength of the external electrode 6 to the element body 4 is further improved. The anchor effect can be obtained by, for example, controlling the particle shape of the glass frit added to a raw material paste of the baked electrode 6a.

As with the baked electrode 6a, the boundary layer 14 can be analyzed by a cross-sectional observation with SEM, STEM, or the like. For example, an average length Lr of the boundary layer 14 and the number of diffusion regions 46a can be measured by an image analysis of a cross-sectional photograph. The composition of the boundary layer 14 can be measured by a component analysis with EPMA.

Next, a method of manufacturing the multilayer ceramic capacitor 2 shown in FIG. 1 is explained.

First, a manufacturing process of the element body 4 is explained. In the manufacturing process of the element body 4, a dielectric paste to be the ceramic layers 10 after firing and an internal-electrode paste to be the internal electrode layers 12 after firing are prepared.

The dielectric paste is prepared, for example, in the following manner. First, dielectric raw materials are uniformly mixed by means such as vet mixing, dried, and thereafter subjected to a heat treatment under predetermined conditions to obtain a calcined powder. Next, a known organic vehicle or a known water based vehicle is added to the obtained calcined powder and kneaded to prepare a dielectric paste. The dielectric paste thus obtained is turned into sheets by a method such as a doctor blade method to obtain ceramic green sheets. If necessary, the dielectric paste may contain an additive selected from various dispersants, plasticizers, dielectrics, sub-component compounds, glass frit, and the like.

Meanwhile, an internal-electrode paste is prepared by kneading a conductive powder made of a conductive metal or an alloy thereof with a known binder and solvent. If necessary, the internal-electrode paste may contain a ceramic powder (e.g., barium titanate powder) as an inhibitor. The inhibitor has an effect of preventing the sintering of the conductive powder in the firing step.

Next, the internal-electrode paste is applied on the ceramic green sheets in a predetermined pattern by various printing methods, such as screen printing, or a transfer method. Then, the green sheets with the internal electrode pattern are laminated and pressed in the lamination direction to obtain a mother laminated body. At this time, the ceramic green sheets and the internal electrode patterns are laminated so that the ceramic green sheets are located on the upper surface and the lower surface of the mother laminated body in the lamination direction.

The mother laminated body obtained by the above-mentioned step is cut into a predetermined size by dicing or push-cutting to obtain a plurality of green chips. If necessary, the green chips may be solidified and dried so as to remove the plasticizer and the like and may be subjected to a barrel polishing using a horizontal centrifugal barrel machine or the like after the solidification and drying. In the barrel polishing, unnecessary parts, such as burrs, generated during the cutting are polished by putting the green chips into a barrel container together with a medium and a polishing liquid and applying a rotational movement or vibration to the barrel container. The green chips after the barrel polishing are washed with a cleaning solution, such as water, and dried.

Next, the green chips obtained above are subjected to a binder removal treatment and a firing treatment to obtain the element body 4.

The conditions for the binder removal treatment are appropriately determined based on the main component composition of the ceramic layers 10 and the main component composition of the internal electrode layers 12 and are not limited. For example, the heating rate is preferably 5-300° C./hour, the holding temperature is preferably 180-400° C., and the temperature holding time is preferably 0.5-24 hours. The binder removal atmosphere is the air or a reducing atmosphere.

The conditions for the firing treatment is appropriately determined based on the main component composition of the ceramic layers 10 and the main component composition of the internal electrode layers 12 and are not limited. For example, the holding temperature during firing is preferably 1200-1350° C., more preferably 1220-1300° C., and the holding time is preferably 0.5-8 hours, more preferably 1-3 hours. The firing atmosphere is preferably a reducing atmosphere. As the atmospheric gas, for example, a mixed gas of $N_2$ and $H_2$ can be humidified and used. When the internal electrode layers 12 are made of a base metal, such as Ni and Ni alloys, the oxygen partial pressure in the firing atmosphere is preferably $1.0 \times 10^{-14}$ to $10^{-10}$ MPa.

After the firing treatment, if necessary, annealing may be performed. Annealing is a treatment for reoxidizing the ceramic layers 10. When the firing treatment is carried out in a reducing atmosphere, annealing is preferably performed. The conditions for the annealing treatment are appropriately determined based on the main component composition of the ceramic layers 10 and the like and are not limited. For example, the holding temperature is preferably 950-1150° C., the temperature holding time is preferably 0-20 hours, and the heating rate and the cooling rate are preferably 50-500° C./hour. Preferably, a humidified $N_2$ gas or the like is used as the atmospheric gas, and the oxygen partial pressure in the annealing atmosphere is $1.0 \times 10^{-9}$ to $1.0 \times 10^{-5}$ MPa.

In the above-mentioned binder removal treatment, firing treatment, and annealing treatment, for example, a wetter is used to humidify the $N_2$ gas, the mixed gas, and the like. In this case, the water temperature is preferably about 5-75° C. The binder removal treatment, the firing treatment, and the annealing treatment may be performed continuously or independently.

Next, a boundary-layer paste is applied to the outer surface of the element body 4 obtained above and baked to form the boundary layer 14. The boundary layer 14 may be formed by ceramic coating with various vapor deposition methods without using a paste.

When the boundary layer 14 is formed with a paste, the boundary-layer paste contains a boundary-layer raw material powder, a binder, and a solvent, and if necessary, a dispersant, a plasticizer, or the like may be added. As the boundary-layer raw material powder, a mixed powder of ZnO powder, $SiO_2$ powder, and $BaCO_3$ powder can be used. Instead, it is possible to use a powder obtained by mixing ZnO powder, $SiO_2$ powder, and $BaCO_3$ powder in a predetermined ratio and then calcining and pulverizing the mixture. As the boundary-layer raw material powder, a composite oxide powder, such as $BaZnSiO_4$ powder, may be used. In addition, the dielectric compound powder (the main component of the ceramic layers 10), a trace compound powder (e.g., $Al_2O_3$), Cu powder, Ni powder, an alloy powder containing Cu, Ni, etc., or the like may be added to the boundary-layer raw material powder.

The binder, solvent, and dispersant used for the boundary-layer paste are not limited and can be materials similar to those of the dielectric paste. For example, the binder can be appropriately selected from various normal binders, such as ethyl cellulose, acrylic, and butyral, and the solvent can be appropriately selected from various organic solvents, such as tarpineol, butyl carbitol, alcohol, methyl ethyl ketone, acetone, and toluene, and water based solvents.

The boundary-layer paste can be applied to the element body 4 by various printing methods, such as a dip method and screen printing, a coating method using a dispenser or the like, a spraying method using a spray, or the like. The boundary-layer paste is applied to at least the end surface 4a of the element body 4 and may be applied to a part of the side surface 4b for forming the external electrode 6. At this time, the average length Lr (average thickness) of the boundary layer 14 can be adjusted by controlling the application amount of the boundary-layer paste.

Next, the boundary layer 14 is formed by drying the element body 4 coated with the boundary-layer paste and subjecting it to a baking treatment at a temperature of 700-1000° C. for 0.1-3 hours. The average length Lr of the boundary layer 14 is also affected by the conditions of the baking treatment. If the temperature during the baking treatment is low or the holding time is short, the average length Lr tends to be small (the average thickness becomes small).

After the boundary layer 14 is formed, the end surface 4a of the element body 4 is preferably subjected to a surface treatment, such as sandblasting, laser irradiation, and barrel polishing. The surface treatment makes it easier to expose the ends of the internal electrode layers 12 to the outermost surface of the end surface 4a and improves the electrical bonding of the internal electrode layers 12 to the external electrode 6.

After the boundary layer 14 is formed, a conductive paste for the baked electrode 6a is applied to the end surface 4a of the element body 4 or from the end surface 4a to a part of the side surface 4b by a dipping method, a printing method, or the like. The conductive paste used at this time contains the glass frit 62 and conductive metal particles to be the conductor 61 after the baking treatment. The conductive paste may further appropriately contain a binder, a solvent, a dispersant, a plasticizer, and sub-component raw materials, such as an oxide powder. The number of diffusion regions 46a is affected by the amount of the glass frit 62 added in the conductive paste. The larger the addition amount of the glass frit 62 is, the larger the number of diffusion regions 46a tends to be.

Then, the baked electrode 6a can be formed by holding the element body 4 coated with the conductive paste at a temperature of 700-1000° C. for 0.1-3 hours.

When a plating electrode layer is formed on the baked electrode 6a, the element body 4 after the baked electrode 6a is formed is subjected to a plating treatment, such as electroplating and electroless plating. When a resin electrode is formed on the baked electrode 6a, a resin-electrode conductive paste containing a thermosetting resin is applied by a dipping method, a printing method, or the like so as to cover the baked electrode 6a and is thereafter subjected to a curing treatment. In this case, a plating electrode layer may further be formed on the resin electrode. Another baked electrode may be laminated on the baked electrode 6a. In this case, the baked electrode 6a and another baked electrode may be subjected to a baking treatment at the same time.

After the above-mentioned process, the multilayer ceramic capacitor 2 including the external electrodes 6 is obtained.

In the above-mentioned process, the boundary layer 14 is formed after green chips are fired, but a boundary-layer paste may be applied to green chips before firing, and the boundary layer 14 may be baked at the same as firing the green chips.

When the boundary layer 14 is formed after the element body 4 is fired, the element body 4 is preferably subjected to a surface treatment, such as sandblasting, laser irradiation, and barrel polishing, as a pretreatment. In this case, the ends of the ceramic layers 10 are selectively polished rather than the ends of the internal electrode layers 12 by the surface treatment on the end surface 4a of the element body 4. Thus, when the boundary-layer paste is applied after the surface treatment, the boundary-layer paste is applied to the portion where the ceramic layers 10 are selectively removed, and the ends of the internal electrode layers 12 is not covered with the boundary layer 14 and easily exposed to the end surface 4a. As a result, the electrical connection between the ends of the internal electrode layers 12 and the external electrode 6 is further improved. The application of the boundary-layer paste to the portion where the ceramic layers 10 are selectively removed further improves the bonding strength of the boundary layer 14 to the ceramic layers 10.

The obtained multilayer ceramic capacitor 2 can be surface-mounted on a substrate, such as a printed wiring board, using solder (including molten solder, solder cream, and solder paste) or a conductive adhesive and can be used in various electronics. Instead, the multilayer ceramic capacitor 2 can be mounted on a substrate via a wire-shaped lead terminal or a plate-shaped metal terminal.

Summary of Embodiment

In the multilayer ceramic capacitor 2 according to the present embodiment, the ceramic layers 10 of the element body 4 contain a perovskite compound (BT, BCT, etc.) as a main component, and the external electrode 6 (baked electrode 6a) includes the conductor 61 and the glass frit 62 containing B, Si, Ba, and Zn. The boundary layer 14 is present at the ends in the X-axis direction of the ceramic layers 10 in contact with the external electrode 6 (baked electrode 6a) and includes an oxide containing Ba, Zn, and Si.

The present inventors have found that the multilayer ceramic capacitor 2 having the above-mentioned configurations improves the joint reliability between the element body 4 and the external electrode 6. That is, the multilayer ceramic capacitor 2 according to the present embodiment can prevent the external electrode 6 from peeling from the end surface 4a of the element body 4 even if receiving a thermal shock. The reason why the above-mentioned effect is obtained is not necessarily clear, but the following reasons can be considered.

First, it is considered that the mutual diffusion phenomenon contributes to the improvement in joint reliability. If the boundary layer 14 is not present, Ba is the only common element between the element body 4 and the external electrode 6. On the other hand, in the multilayer ceramic capacitor 2 according to the present embodiment, since the boundary layer 14 is present at the joint part with the external electrode 6, Ba, Zn, and Si are common elements between the element body 4 and the external electrode 6. Since a plurality of common elements is present, multiple common elements are considered to mutually be diffused between the baked electrode 6a and the boundary layer 14. As a result, the joint strength of the external electrode 6 to the element body 4 is improved.

In particular, it is considered that the above-mentioned mutual diffusion becomes more active as there are more parts where the glass frit 62 of the baked electrode 6a is directly in contact with the boundary layer 14. In the present embodiment, the number of diffusion regions 46a existing in a predetermined length Lz (Lz=100 μm) of the joint boundary 46 is three or more, and the joint strength of the external electrode 6 to the element body 4 is further improved by satisfying this requirement.

The boundary layer 14 is considered to exhibit a function of reducing the thermal stress generated between the element body 4 and the external electrode 6, and the stress reduction effect is considered to improve the resistance for thermal shock and the like.

If the boundary layer 14 is not present, there is a difference in linear expansion coefficient between a baked electrode containing an amorphous glass frit and crystalline ceramic layers. In this case, if a thermal shock is applied to the multilayer ceramic capacitor, a thermal stress is generated between the baked electrode and the ceramic layers, which is considered to be a factor of peeling of the baked electrode. On the other hand, in the present embodiment, since the boundary layer 14 is composed of an oxide containing predetermined elements, the difference in linear expansion coefficient between the external electrode 6 and the element body 4 is small. That is, the linear expansion coefficient of the boundary layer 14 exhibits a value close to the linear expansion coefficient of the ceramic layers 10. As a result, it is considered that the generation of thermal stress based on the difference in linear expansion coefficient can be prevented, and the resistance to thermal shock is further improved.

In particular, in the present embodiment, the main component (oxide) of the boundary layer 14 includes a Zn content of 0.27 parts by mol to 0.40 parts by mol, a Si content of 0.27 parts by mol to 0.40 parts by mol, and a remainder of Ba. Instead, the main component (oxide) of the boundary layer 14 is $BaZnSiO_4$. When the composition of the boundary layer 14 satisfies the above-mentioned requirements, the difference in linear expansion coefficient between the baked electrode 6a and the end surface 4a of the element body 4 is considered to be smaller, and the resistance to thermal shock is further improved. In addition, the mutual diffusion between the baked electrode 6a and the boundary layer 14 is considered to be more active, and the joint strength of the external electrode 6 to the element body 4 is further improved.

Moreover, in the present embodiment, the glass frit 62 contained in the baked electrode 6a includes a Si content of 0.05 parts by mol to 0.20 parts by mol, a Ba content of 0.05 parts by mol to 0.25 parts by mol, a Zn content of 0.15 parts by mol to 0.35 parts by mol, and a remainder of B. When the composition of the glass frit 62 satisfies the above-mentioned requirements, the mutual diffusion between the baked electrode 6a and the boundary layer 14 is considered to be more active, and the joint strength of the external electrode 6 to the element body 4 is further improved.

Hereinbefore, an embodiment of the present invention is explained, but the present invention is not limited to the above-mentioned embodiment and can be modified variously without departing from the gist of the present invention.

In the present embodiment, for example, the multilayer ceramic capacitor 2 is exemplified as the ceramic electronic device, but the ceramic electronic device of the present invention may be, for example, bandpass filters, multilayer three-terminal filters, piezoelectric elements, PTC thermistors, NTC thermistors, varistors, or the like.

In the present embodiment, the ceramic layers 10 and the internal electrode layers 12 are laminated in the Z-axis direction, but the lamination direction may be the X-axis direction or the Y-axis direction. In that case, the external electrodes 6 are formed according to the exposed surfaces of the internal electrode layers 12. The element body 4 is not necessarily a laminated body and may be a single layer. The internal electrode layers 12 may be drawn out to the outer surface of the element body 4 via through-hole electrodes. In this case, the through-hole electrodes and the external electrodes 6 are electrically connected to each other.

EXAMPLES

Hereinafter, the present invention is explained in more detail with examples of the present invention, but the present invention is not limited to the examples.

Experiment 1

In Experiment 1, multilayer ceramic capacitors 2 according to Examples 1-3 were manufactured in the following manner. First, a dielectric paste and an internal-electrode paste were prepared, and green chips were manufactured by a sheet method using the pastes. At this time, as a dielectric raw material to be a main component of ceramic layers 10, barium titanate (BT) was used in Example 1 and Example 2, and barium titanate calcium (BCT) was used in Example 3. In each Example, $MgCO_3$, $MnCO_3$, $Y_2O_3$, $SiO_2$, and the like were added as sub-components of the ceramic layers 10, and the main component of internal electrode layers 12 was Ni.

Next, the green chips obtained above were subjected to a binder removal treatment with the conditions mentioned in the embodiment, and a boundary-layer paste was applied to the outer surfaces (end surfaces) of the green chips by a dipping method and dried. As a main component of the boundary layer 14, a $BaZnSiO_4$ powder was added to the boundary-layer paste used in Examples 1-3. In addition to the $BaZnSiO_4$ powder, a $BaTiO_3$ powder was added to the boundary-layer paste of Example 2, and a $(Ba,Ca)TiO_3$ powder was added to the boundary-layer paste of Example 3.

Next, the green chips coated with the boundary-layer paste were subjected to a firing treatment to obtain an element body 4 with the boundary layers 14 on the end surfaces 4a. The conditions for the firing treatment were holding temperature: 1250° C., holding time: 2 hours, and atmospheric gas: humidified $N_2+H_2$ mixed gas. Then, the above-mentioned element body 4 was subjected to an annealing treatment with the conditions mentioned in the embodiment. In addition, the element body 4 was subjected to barrel polishing so as to expose the ends of the internal electrode layers 12 to the end surfaces 4a.

Next, a baked-electrode conductive paste was prepared, and this paste was applied to the outer surface of the element body 4 (a part of the end surface 4a and the side surface 4b) by a dipping method and dried. In the conductive paste used in Examples 1-3, Cu was added as a conductor powder, and B, Si, Ba, and Zn based glass frit was added as a glass frit 62. Then, a baked electrode 6a was formed on the outer surface of the element body 4 by holding the element body 4 coated with the conductive paste at 800° C. for 0.5 hours and baking the conductive paste. A Ni plating electrode layer and a Sn plating electrode layer were formed on the baked electrode 6a. Accordingly, capacitor samples (multilayer ceramic capacitors 2) with the external electrodes 6 were obtained. 400 or more capacitor samples were manufactured for each of Examples 1-3.

In each of Examples 1-3 of Experiment 1, the size of the element body 4 in any of the capacitor samples was L0×W0×T0=2.0 mm×1.25 mm×1.25 mm. The lamination number of ceramic layers 10 sandwiched by the internal electrode layers 12 was 80.

Samples for destructive inspection were extracted from the capacitor samples according to each of Examples 1-3, and a cross-sectional observation was performed by SEM using the samples. Specifically, the extracted samples were cut along the X-Z plane, the cross sections were subjected to mirror polishing, and an average thickness Td of the ceramic layers 10, an average thickness Te of the internal electrode layers 12, an average length Lr of the boundary layer 14, and an average thickness of the baked electrode layers were thereafter measured by SEM. The measurement results of Examples 1-3 were as follows.

Average Thickness Td of Ceramic layers 10: 10 μm
Average Thickness Te of Internal Electrode Layers 12: 1.5 μm
Average Length Lr of Boundary Layer 14: 5 μm
Average Thickness of Baked Electrode Layer: 25 μm In the above-mentioned cross-sectional observation, a component analysis for the boundary layers 14 and the baked electrode 6a was performed by EPMA. As a result, the composition of the raw material powder added to the raw material pastes (the boundary-layer paste and the baked-electrode conductive paste) and the measurement results were substantially the same in any of Examples. In the cross-sectional observation, the boundary layers 14 were formed at the ends of the ceramic layers 10 in the X-axis direction in all of Examples.

In Experiment 1, two types of thermal shock tests (thermal cycle tests) were performed for evaluation of the joint reliability of the external electrodes 6 in the prepared capacitor samples. The details are explained below.

Air-Tank-Type Thermal Shock Test

In an air-tank-type thermal shock test, the test samples (capacitor samples) were held in an air tank at −55° C. for 30 minutes and then held in an air tank at 150° C. for 30 minutes per cycle, and this was repeated for 1000 cycles. In this test, pass/fail was determined based on the attenuation rate in capacitance. A sample where a ratio $(C_\beta/C_\alpha)$ of a capacitance $C_\beta$ after the test to a capacitance $C_\alpha$ before the test was 0.9 (90%) or more was considered to be pass, and a sample where a ratio $(C_\beta/C_\alpha)$ of a capacitance $C_\beta$ after the test to a capacitance $C_\alpha$ before the test was less than 0.9 was considered to be fail. In Experiment 1, the test was performed on 80 capacitor samples in each Example. A ratio of failed samples (NG ratio) was calculated. The evaluation results are shown in Table 1.

Liquid-Tank-Type Thermal Shock Test

In a liquid-tank-type thermal shock test, a thermal cycle was performed with a liquid tank, not an air tank. When a liquid tank is used, a steeper temperature change is applied to test samples compared to when an air tank is used, and the joint reliability of test samples can thus be evaluated under harsher conditions than in the air-tank-type test. Specifically, in the present examples, the test samples were held in a liquid tank at −55° C. for 30 minutes and then held in a liquid tank at 150° C. for 30 minutes per cycle, and this was repeated for 1000 cycles. As with the air-tank-type thermal shock test, pass/fail in the liquid-tank-type thermal shock test was determined based on the attenuation rate in capacitance. In Experiment 1, the test was performed on 80 capacitor samples. A ratio of failed samples (NG ratio) was calculated. The evaluation results are shown in Table 1.

Comparative Example 1

In Experiment 1, capacitor samples (multilayer ceramic capacitors) according to Comparative Example 1 (no boundary layers were formed) were manufactured so as to confirm the superiority of Examples 1-3 (the boundary layers were formed). Specifically, in Comparative Example 1, external electrodes were directly formed on the outer surface of the element body 4 after firing without using a boundary-layer paste. In Comparative Example 1, the production conditions were the same as those of Example 1 described above except for forming no boundary layers 14, and Comparative Example 1 was evaluated in the same manner as in Example 1. The evaluation results are shown in Table 1.

chips. In the present example, the above-mentioned formation method is referred to as Manufacturing Method 1. The manufacturing conditions of Example 4 were common with those of Example 1.

Example 5

In Example 5, a boundary-layer paste was applied to the outer surface of the element body 4 subjected to the firing and annealing treatments by a dipping method and dried. After that, the element body 4 coated with the boundary-layer paste was subjected to a baking treatment by being held at 800° C. for 0.5 hours, and the boundary layer 14 was formed. In the present example, the above-mentioned formation method is referred to as Manufacturing Method 2. The manufacturing conditions of Example 5 other than the above were common with those of Example 1.

TABLE 1

| Sample No. | Main Component of Ceramic Layers | Oxide Contained in Boundary Layers | Baked Electrode Conductor | Baked Electrode Glass Frit | Results of Thermal Shock Tests (NG Number/Number of Test Samples n) Air-tank-type | Results of Thermal Shock Tests (NG Number/Number of Test Samples n) Liquid-tank-type |
|---|---|---|---|---|---|---|
| Comp. Ex. 1 | $BaTiO_3$ | — | Cu | B—Si—Ba—Zn based glass | 5/80 | — |
| Ex. 1 | $BaTiO_3$ | $BaZnSiO_4$ | Cu | B—Si—Ba—Zo based glass | 0/80 | 2/80 |
| Ex. 2 | $BaTiO_3$ | $BaZnSiO_4 + BaTiO_3$ | Cu | B—Si—Ba—Zn based glass | 0/80 | 0/80 |
| Ex. 3 | $(Ba,Ca)TiO_3$ | $BaZnSiO_4 + (Ba,Ca)TiO_3$ | Cu | B—Si—Ba—Zn based glass | 0/80 | 0/80 |

As shown in Table 1, the NG ratio of the air-tank-type thermal shock test was 5/80 in Comparative Example 1. Meanwhile, in Examples 1-3 (the boundary layers 14 containing predetermined elements were formed), the NG ratio of the air-tank-type thermal shock test was 0/80, and the formation of the boundary layers 14 improved the joint reliability of the external electrodes 6.

In Examples 2 and 3, the NG ratio of the liquid-tank-type thermal shock test was 0/80. This result indicates that the inclusion of the main component of the ceramic layers 10 in the boundary layers 14 further improved the joint reliability of the external electrodes 6.

Experiment 2

In Experiment 2, the capacitor samples according to Examples 4-6 were manufactured by changing the method of forming the boundary layers 14. The method of forming the boundary layers 14 in each Example is explained below.

Example 4

In Example 4, as with Example 1 of Experiment 1, the boundary layers 14 were formed by applying a boundary-layer paste to green chips before firing and baking the boundary-layer paste at the same time as firing the green Example 6

In Example 6, the element body 4 subjected to the firing and annealing treatments was subjected to a barrel polishing before forming the boundary layers 14. Then, a boundary-layer paste was applied to the outer surface of the element body 4 subjected to the wet barrel polishing by a dipping method and dried. After that, the element body 4 coated with the boundary-layer paste was subjected to a baking treatment by being held at 800° C. for 0.5 hours, and the boundary layer 14 was formed. In the present example, the above-mentioned formation method is referred to as Manufacturing Method 3. The manufacturing conditions of Example 6 other than the above were common with those of Example 1.

In Experiment 2, the thermal shock tests were also performed similarly to Experiment 1 for the capacitor samples of each of Examples 4-6. In Experiment 2, a liquid-tank-type thermal shock test in which the number of evaluation samples number) was increased from 80 to 200 was also performed. The evaluation results are shown in Table 2.

TABLE 2

| Sample No. | Formation Method of Boundary Layers | Results of Thermal Shock Tests (NG Number/Number of Test Samples n) Air-tank-type | Results of Thermal Shock Tests (NG Number/Number of Test Samples n) Liquid-tank-type 1 | Results of Thermal Shock Tests (NG Number/Number of Test Samples n) Liquid-tank-type 2 |
|---|---|---|---|---|
| Ex. 4 | Manufacturing Method 1 | 0/80 | 2/80 | — |
| Ex. 5 | Manufacturing Method 2 | 0/80 | 0/80 | 1/200 |
| Ex. 6 | Manufacturing Method 3 | 0/80 | 0/80 | 0/200 |

As shown in Table 2, the joint reliability of the external electrodes 6 in Examples 5 and 6 (the boundary-layer paste was applied to the element body 4 after firing) was more favorable than that in Example 4 (the boundary-layer paste was applied to the green chips). In Example 6, the NG ratio was also 0/200 in the liquid-tank-type thermal shock test with a larger n number. This result indicates that the barrel polishing performed as a pretreatment in the formation of the boundary layers 14 further improved the joint reliability of the external electrodes 6.

Experiment 3

In Experiment 3, capacitor samples according to Examples 11-14 (the composition ratio of the boundary layers 14 was changed) and capacitor samples according to Examples 15-20 (the composition ratio of the glass frit 62 was changed) were manufactured.

Specifically, in Examples 11-14, a raw material powder of a boundary-layer paste was prepared by mixing a $BaCO_3$ powder, a ZnO powder, and a $SiO_2$ powder in a predetermined ratio and calcining and pulverizing this mixed powder. Then, the boundary layers 14 were formed by the same method (Manufacturing Method 1) as Example 1 using this boundary-layer paste, and capacitor samples were obtained. Except for the above, the experimental conditions of Examples 11-14 were the same as those of Example 1, and the same evaluation as in Experiment 1 was carried out. The evaluation results are shown in Table 3. The composition of the boundary layers 14 shown in Table 3 is a measurement result of a component analysis by SEM-EPMA. The each element content is shown provided that the total of the Ba content, the Zn content, and the Si content was 1.0 part by mol.

Meanwhile, in Examples 15-20, boundary layers 14 were formed by the same method (Manufacturing Method 1) as Example 1, and a conductive paste containing a glass frit 62 prepared in a predetermined composition ratio was applied onto the boundary layers 14. The glass fit 62 added to the conductive paste was obtained by mixing a $BaCO_3$ powder, a ZnO powder, a $SiO_2$ powder, and a $B_2O_3$ powder in a predetermined ratio and calcining and pulverizing the mixture. Capacitor samples with the baked electrode 6a were obtained by applying the conductive paste with a dipping method and thereafter subjecting it to a baking treatment. Except for the above, the experimental conditions of Examples 15-20 were the same as those of Example 1, and the same evaluation as in Experiment 1 was carried out. The evaluation results are shown in Table 4. The composition of the glass fit 62 shown in Table 4 is a measurement result of a component analysis by SEM-EPMA. The each element content is shown provided that the total of the Ba content, the Zn content, the Si content, and the B content was 1.0 part by mol.

TABLE 3

| | Composition of Boundary Layers | | | Results of Thermal Shock Tests | |
|---|---|---|---|---|---|
| Sample No. | Ba parts by mol | Zn parts by mol | Si parts by mol | Air-tank-type NG Ratio | Liquid-tank-type NG Ratio |
| Ex. 11 | 0.282 | 0.320 | 0.398 | 0/80 | 0/80 |
| Ex. 12 | 0.381 | 0.340 | 0.279 | 0/80 | 0/80 |
| Ex. 13 | 0.360 | 0.272 | 0.368 | 0/80 | 0/80 |
| Ex. 14 | 0.320 | 0.392 | 0.288 | 0/80 | 0/80 |

TABLE 4

| | Composition of Glass Frit in Baked Electrode | | | | Results of Thermal Shock Tests | |
|---|---|---|---|---|---|---|
| Sample No. | Ba parts by mol | Zn parts by mol | Si parts by mol | B parts by mol | Air-tank-type NG Ratio | Liquid-tank-type NG Ratio |
| Ex. 15 | 0.07 | 0.22 | 0.13 | 0.58 | 0/80 | 0/80 |
| Ex. 16 | 0.24 | 0.24 | 0.11 | 0.41 | 0/80 | 0/80 |
| Ex. 17 | 0.13 | 0.16 | 0.12 | 0.59 | 0/80 | 0/80 |
| Ex. 18 | 0.23 | 0.34 | 0.17 | 0.26 | 0/80 | 0/80 |
| Ex. 19 | 0.16 | 0.28 | 0.06 | 0.50 | 0/80 | 0/80 |
| Ex. 20 | 0.17 | 0.24 | 0.18 | 0.41 | 0/80 | 0/80 |

As shown in Table 3, the NG ratio of each of the air-tank-type thermal shock test and the liquid-tank-type thermal shock test was 0% in Examples 11-14. This result indicates that when the composition of the boundary layers 14 was within the range of Examples 11-14, the joint reliability of the external electrodes 6 was further improved.

As shown in Table 4, the NG ratio of each of the air-tank-type thermal shock test and the liquid-tank-type thermal shock test was 0% in Examples 15-20. This result indicates that when the composition of the glass frit 62 was within the range of Examples 15-20, the joint reliability of the external electrodes 6 was further improved.

Experiment 4

In Experiment 4, capacitor samples according to Examples 21-23 (the number of diffusion regions 46a was changed) were manufactured. The number of diffusion regions 46a was controlled by the amount of the glass frit 62 added to a baked-electrode conductive paste. Except for the above, the experimental conditions of Examples 21-23 were the same as those of Example 1 (i.e., the formation method of the boundary layers 14: Manufacturing Method 1), and the same evaluation as in Experiment 1 was carried out. The evaluation results are shown in Table 5.

The number of diffusion regions 46a was calculated as an average by extracting five samples for destruction test from the manufactured capacitor samples and observing five or more visual fields of the cross sections of each extracted sample.

TABLE 5

| Sample No. | Number of Diffusion Regions Number/100 μm | Results of Thermal Shock Tests | |
|---|---|---|---|
| | | Air-tank-type NG Ratio | Liquid-tank-type NG Ratio |
| Ex. 21 | 2.1 | 0/80 | 1/80 |
| Ex. 22 | 3.0 | 0/80 | 0/80 |
| Ex. 23 | 7.1 | 0/80 | 0/80 |

The results of Table 5 indicate that when the number of diffusion regions 46a existing in 100 μm of the joint boundary was three or more, the joint reliability of the external electrodes 6 was further improved.

DESCRIPTION OF THE REFERENCE NUMERICAL

2 . . . multilayer ceramic capacitor
4 . . . element body
4a . . . end surface
4b . . . side surface
10 . . . ceramic layer
12 . . . internal electrode layer
14 . . . boundary layer
6 . . . external electrode
6a . . . baked electrode
61 . . . conductor
62 . . . glass frit
46 . . . joint boundary
46a . . . diffusion region

What is claimed is:

1. A ceramic electronic device comprising:
an element body including:
a ceramic layer comprising a perovskite compound represented by $ABO_3$ as a main component; and
an internal electrode layer;
an external electrode on an end surface of the element body and electrically connected to a part of the internal electrode layer, the external electrode comprising:
a conductor; and
a glass frit diffused in the conductor, the glass frit comprising B, Si, Ba, and Zn; and
a boundary layer at an end of the ceramic layer in contact with the external electrode on the end surface of the element body and comprising an oxide including:
a Zn content of 0.27 parts by mol to 0.40 parts by mol;
a Si content of 0.27 parts by mol to 0.40 parts by mol; and
a remainder of Ba, provided that a total of the Ba content, the Zn content, and the Si content is 1 part by mol.

2. The ceramic electronic device according to claim 1, wherein the boundary layer further comprises the perovskite compound.

3. The ceramic electronic device according to claim 1, wherein the oxide contained in the boundary layer is $BaZnSiO_4$.

4. The ceramic electronic device according to claim 1, wherein the glass frit contained in the external electrode comprises:
a Si content of 0.05 parts by mol to 0.20 parts by mol;
a Ba content of 0.05 parts by mol to 0.25 parts by mol;
a Zn content of 0.15 parts by mol to 0.35 parts by mol; and
a remainder of B,
provided that a total of the B content, the Si content, the Ba content, and the Zn content is 1 part by mol.

5. The ceramic electronic device according to claim 1, wherein the conductor contained in the external electrode comprises Cu.

6. The ceramic electronic device according to claim 1, wherein three or more diffusion regions, where the glass frit is directly in contact with the boundary layer, are present in 100 μm of a joint boundary between the end surface of the element body and the external electrode in a cross section including the joint boundary.

7. A ceramic electronic device comprising:
an element body including:
a ceramic layer comprising a perovskite compound represented by $ABO_3$ as a main component; and
an internal electrode layer;
an external electrode on an end surface of the element body and electrically connected to a part of the internal electrode layer, the external electrode comprising:
a conductor; and
a glass frit diffused in the conductor, the glass frit comprising:
a Si content of 0.05 parts by mol to 0.20 parts by mol;
a Ba content of 0.05 parts by mol to 0.25 parts by mol;
a Zn content of 0.15 parts by mol to 0.35 parts by mol; and
a remainder of B, provided that a total of the B content, the Si content, the B a content, and the Zn content is 1 part by mol; and
a boundary layer at an end of the ceramic layer in contact with the external electrode on the end surface of the element body and comprising an oxide including Ba, Zn, and Si.

8. The ceramic electronic device according to claim 7, wherein the boundary layer further comprises the perovskite compound.

9. The ceramic electronic device according to claim 7, wherein the oxide contained in the boundary layer is BaZnSiO$_4$.

10. The ceramic electronic device according to claim 7, wherein the conductor contained in the external electrode comprises Cu.

11. The ceramic electronic device according to claim 7, wherein three or more diffusion regions, where the glass frit is directly in contact with the boundary layer, are present in 100 μm of a joint boundary between the end surface of the element body and the external electrode in a cross section including the joint boundary.

* * * * *